United States Patent [19]
Lewiner et al.

[11] Patent Number: 5,493,295
[45] Date of Patent: Feb. 20, 1996

[54] SYSTEM FOR INFORMING USERS ABOUT URBAN TRANSPORT

[75] Inventors: Jacques Lewiner, Saint Cloud; Eric Carreel, Paris, both of France

[73] Assignee: Jean-Claude Decaux, Neuilly Sur Seine, France

[21] Appl. No.: 211,085

[22] PCT Filed: Jul. 20, 1993

[86] PCT No.: PCT/FR93/00739

§ 371 Date: May 18, 1994

§ 102(e) Date: May 18, 1994

[87] PCT Pub. No.: WO94/02923

PCT Pub. Date: Feb. 3, 1994

[30] Foreign Application Priority Data

Jul. 22, 1992 [FR] France .................................. 92 09042

[51] Int. Cl.⁶ .................................................. G08G 1/123
[52] U.S. Cl. .......................... 340/994; 340/539; 340/991
[58] Field of Search ............................ 340/994, 539, 340/991, 988; 364/436

[56] References Cited

U.S. PATENT DOCUMENTS

| | | | |
|---|---|---|---|
| 4,297,672 | 10/1981 | Fruchey et al. | 340/994 |
| 4,713,661 | 12/1987 | Boone et al. | 340/994 |
| 4,799,162 | 1/1989 | Shinkawa et al. | 340/994 |
| 5,168,451 | 12/1992 | Bolger | 340/994 |

FOREIGN PATENT DOCUMENTS

| | | | |
|---|---|---|---|
| 0451756 | 10/1991 | European Pat. Off. . | |
| 2185824 | 1/1974 | France . | |
| 2556864 | 6/1985 | France . | |
| 2648938 | 12/1990 | France | 340/994 |
| 0288400 | 11/1988 | Japan | 340/994 |
| 0090299 | 3/1990 | Japan | 340/994 |
| 5028398 | 2/1993 | Japan | 340/994 |
| 9313510 | 7/1993 | WIPO | 340/994 |

OTHER PUBLICATIONS

Patent Abstracts of Japan, vol. 14, No. 105 (E-895) Feb. 26, 1990, & JP-A-13 07 341 (Fujitsu Ltd) Dec. 12, 1989.

*Primary Examiner*—Brent A. Swarthout
*Attorney, Agent, or Firm*—Larson and Taylor

[57] ABSTRACT

A system for displaying waiting times for buses (2) approaching various stops (1) of a network. The system comprises means for generating electromagnetic signals (8) whose addresses are based on the buses, fixed receivers (9) of said signals for display purposes at the stops themselves, and preferably also portable appliances (10) also capable of receiving said signals and suitable for displaying the waiting times for buses at any stop of the network in response to interrogation by users bearing said appliances.

3 Claims, 1 Drawing Sheet

SYSTEM FOR INFORMING USERS ABOUT URBAN TRANSPORT

BACKGROUND OF THE INVENTION

1. Field of the Invention

The invention relates to systems for informing users of urban public transport about the real positions at each instant of the transport vehicles that they are considering taking.

2. The Prior Art

The vehicles concerned in this case are more particularly self-propelled surface urban public transport vehicles and they are referred to below by the word "buses".

It is recalled that in general it is not possible to predict exactly the instants at which the buses serving a given line in an urban transport network will serve each of the bus stops or "stops" of the line.

Although the instants at which the various buses leave the departure depot of the line can be determined accurately, it is not possible to know in advance what difficulties each bus will encounter as it travels along the corresponding line, essentially because of the unpredictable formation of more or less dense "holdups" along the line that may slow traffic down or even stop it temporarily.

Thus, in general, users going to one of the various stops of the line for the purpose of taking one of the buses serving it do not know how long they will have to wait for the next bus to arrive.

They are therefore reduced to waiting for the next bus to arrive without knowing whether their wait will be short or otherwise.

This ignorance constitutes a serious drawback for surface urban public transport.

For fear of being obliged to wait a long time for a bus, which time may reach or even exceed quarter of an hour, and may sometimes take place under conditions of relative discomfort, e.g. standing and exposed to bad weather, numerous potential users use some other form of transport, such as an underground railway or a taxi, while regretting that they cannot benefit from the advantages of surface transport such as a pleasant trip associated with a cheap fare.

To remedy this drawback, proposals have already been for certain bus stops to display information relating to the waiting time expected before the next bus arrives.

That constitutes real progress.

However, to obtain such information, a user must actually go to a bus stop that has been improved in that way.

The information then acquired concerning the waiting time for the next bus is certainly advantageous in that it helps the user to be patient if the time is long.

However it loses much of its advantage since the user still has practically no opportunity of avoiding wasting time, since the range of activities that a user can undertake on the spot is generally extremely limited.

To remedy that new drawback, proposals have already been made to made portable appliances available to the users of buses in a network, the appliances including, inter alia, means for displaying the waiting times associated with buses that can be taken (see document EP-A-0 451 756).

That concept is advantageous.

However, in the implementations proposed, each appliance is associated with a single bus stop, such that the problem of informing the user is solved in part only.

Thus, the portable appliance enables the user to be informed remotely about the waiting time for buses at the usual bus stop from which the user makes bus trips, which bus stop is generally close to home, assuming that the appliance is associated with that bus stop.

However, the appliance is incapable of giving any information about the waiting times for buses serving other bus stops in the network.

Unfortunately, it is often for a user's return journey that the information in question would be the most useful, in particular such information would enable a user to spend a few more minutes performing activities away from home, e.g. examining goods on sale in a shop, with such examination possibly also being associated with consulting a specialist.

In addition to the above limitation on performance due to the fact that each appliance is associated with a single bus stop, information systems that have been proposed in the past also suffer from the drawback of being of complex organisation, and therefore slow, thus making it difficult to update the displayed information accurately, with this being for reasons that are explained below.

In said systems, the information transmitted over an electromagnetic path and made use of by bus stops and by portable appliances associated with said stops is the same, and it is generated by a common facility required to serve all of the various stops in the network in question, such that each item of data is associated with an encoded address representative of one of the stops.

The receivers included respectively in a given bus stop and in the appliances associated with said bus stop are therefore of the same type, with the main difference between these two receivers lying in that one of them is fixed while the other one is portable.

The addressed items of information in question relate in particular to the approximate waiting times for the two "approaching" buses expected at the stop in question: the fixed or portable receivers located at said bus stop or in the vicinity thereof then merely decode and display those waiting times.

That kind of organization constitutes considerable overhead since it requires:

a very large number of different signals to be transmitted in succession over the electromagnetic path, which number is theoretically equal to the total number N of stops included throughout the network in question; and for each signal "addressed" to a given stop, a large number P of constituent information units (generally "binary digits" or "bits"), each signal being required to provide, for example, sufficient data to identify the waiting times for the next two buses expected at the stop in question.

The total number NP of information units to be transmitted over the electromagnetic path in known solutions is therefore very high, and this presents the drawback of requiring a long duration or a high data rate for transmitting all of the information useful to the network.

The long duration means a long period before the transmission is renewed, which transmission is preferably renewed cyclically: a result of the length of this period is a long overall response time, and thus information for display may be updated very late, and this can make the system unusable in practice if the observed delays reach or exceed one minute.

A high data rate means that it is difficult for the transmission considered herein to make use of the sidebands left available by urban radiotelephone transmissions, since said sidebands are too narrow for excessively high rates of transmission.

SUMMARY OF THE INVENTION

A particular object of the invention is to remedy the above drawbacks, and in particular:

to propose "universal" portable appliances, i.e. appliances capable of selecting and displaying bus waiting times corresponding to any stop in the network under consideration; and to do that while greatly reducing the number of information units required to make up all of the useful information signals of the network, and thereby firstly reducing the duration of electromagnetic transmission of the information and thus the overall response time that stems therefrom, and secondly reducing the bandwidth required for the transmission channels.

To this end, according to the invention, information systems of the kind in question still comprise, firstly a management facility including means for receiving data identifying the instantaneous positions of the various buses travelling over the various lines of the network, means for responding to said data by generating electrical information signals concerning said positions, and means for transmitting said signals over an electromagnetic path, and secondly a plurality of receivers, including portable receivers, each receiver having means for receiving said signals and for selecting from them those that have a relationship with a given stop, and means responding to the signals selected in this way by displaying information relating to the waiting times for buses at said stop, and they are essentially characterized in that firstly each of the electrical information signals transmitted by the electromagnetic path is associated with a given bus and is tied to the distance between said bus and a stop of the corresponding line, and in that, secondly, the portable receivers are in the form of appliances comprising firstly interrogation means suitable for actuation by users and capable of identifying any given stop of the network, and secondly means suitable for causing the above electrical signals to be selected in response to said interrogations and with the help of signals selected in this way successively to operate means for calculating the waiting times to be displayed, and means for displaying said times.

In preferred embodiments, use is also made of one and/or the other of the following dispositions:

the signals emitted via the electromagnetic path form a signal sequence that is transmitted cyclically, and each portable appliance includes memory means designed to record the data relating to the complete transmission cycle preceding each instant so that the data corresponding to any particular interrogation can be made available instantly as soon as said interrogation has been performed; and the signals transmitted by the electromagnetic path are made secret by suitable encrypting and the portable receiver appliances include means for decrypting at least some of said signals.

The invention also provides the portable receiver appliances included in the above information systems.

Apart from the main dispositions explained above, the invention further includes certain other dispositions that are preferably used simultaneously therewith and that are explained in greater detail below.

Preferred embodiments of the invention are described below with reference to the accompanying drawing, naturally in non-limiting manner.

DESCRIPTION OF THE PREFERRED EMBODIMENTS

Figure 1:
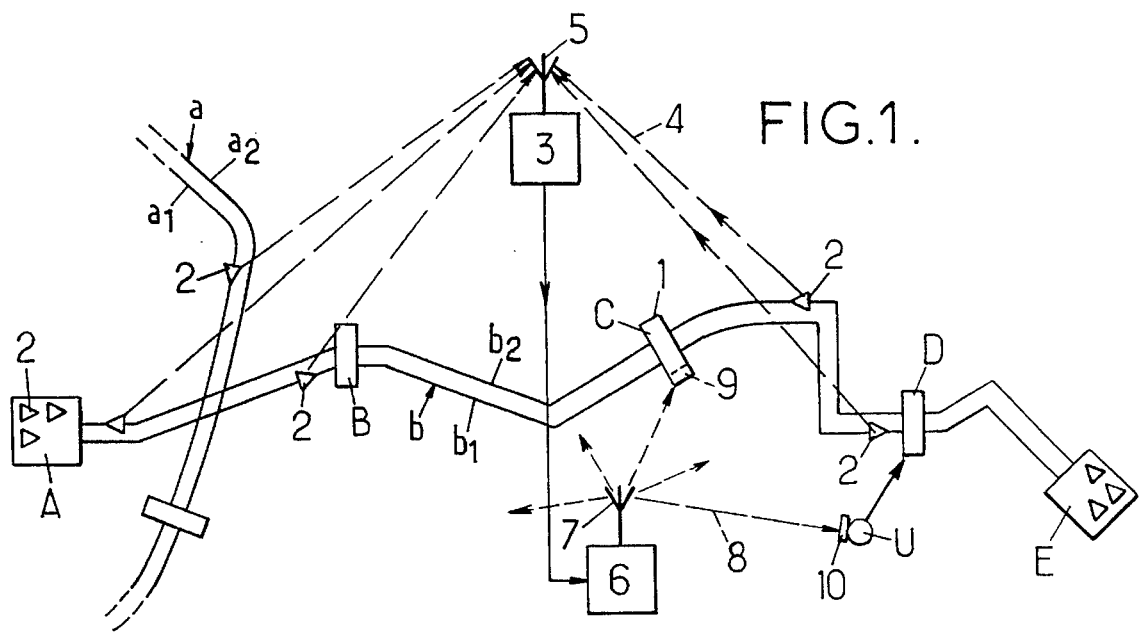
FIG. 1 of the drawing is a highly diagrammatic fragmentary map of a bus network together with an installation for informing users of buses of the network, which installation is set up in accordance with the invention.

The portion of bus network shown in FIG. 1 shows two lines of the network, given respective references a and b, and each line having two opposite-direction "paths" or "parts" (respectively $a_1$ & $a_2$; and $b_1$ & $b_2$).

By way of example, path $b_1$ of line b extends from a departure depot A to an arrival depot E and includes three intermediate bus stops or "stops" 1 more particularly referenced herein by the letters B, C, and D.

Naturally, in reality, the number N of stops corresponding to each bus line is much greater than three, and generally of the order of several tens.

The buses serving the various lines of the network are represented by small triangles 2 pointing in their travel directions.

Here again, the number n of buses serving each line has been greatly reduced for reasons of clarity.

However the number n of buses is always much less than the number N of stops served.

Rectangle 3 designates a central station for managing the network.

Means represented diagrammatically by dashed lines 4 are provided for generating and conveying to the station 3 information i enabling the real positions of the various buses 2 at each instant to be identified.

Each item of information i comprises an "address" α allocated to a bus under consideration, which address itself includes data suitable for identifying the "path" being followed by the bus.

These means are implemented in any appropriate manner.

For example, they may be implemented by telephone messages sent by the bus drivers to the station 3.

However, it is generally preferred to adopt automatic means that do not require any intervention on the part of the bus drivers and that make use of radio links between transmitters mounted on said buses and the station 3.

The station 3 includes memory means in which data is recorded enabling the various lines of the network to be identified and also enabling the various stops 1 of each of the lines to be identified.

The station 3 also includes calculation means capable, at each instant, of comparing each item of information i suitable for identifying the position of a given bus 2 of address α with the data stored in the memory means so as to generate an electrical signal s representing the distance between said bus 2 and the "next" stop 1 that is to be served by the bus.

All of the electrical signals s as generated in this way are sent from the station 3 to a transmitter 6 that includes a transmit antenna 7 from which the electrical signals are transmitted into space in the form of electromagnetic waves.

Figure 2:
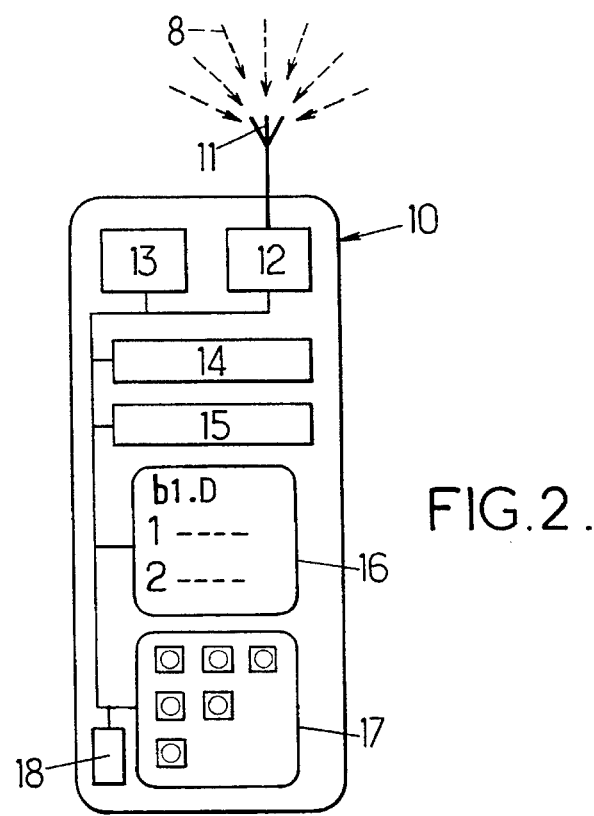
FIG. 2 is a diagram of a portable receiver appliance included in such an installation.

These waves are represented by dashed lines 8 in FIGS. 1 and 2.

A certain number of receivers are organized to receive and make use of the signals 8 transmitted in this way.

Some of the receivers 9 may be fixed and be intended for installing in the stops 1.

Other receivers 10 are portable and are made available to users.

Whereas the fixed receivers 9 are associated solely with informing users at the stops 1 that are fitted with said receivers, to tell the users about the waiting times for the next buses at those stops, the receivers 10 are more universal, being organized to inform users about the waiting times for the buses approaching any of the stops in the network, with this being done in response to appropriate interrogations by the users.

Each portable receiver 10 comprises:

- an antenna 11 associated with a receiver device 12 for receiving electromagnetic signals;
- a circuit 13 for decoding these signals;
- a memory circuit 14;
- a microprocessor 15;
- a data display device 16, including, in particular, a video screen;
- an interrogation device 17, generally comprising a keypad; and
- a source of electricity 18, generally constituted by a battery.

These components are associated in such a manner as to make the following operation possible.

A user U (FIG. 1) possessing an appliance 10 desires to know the waiting times for the buses approaching a stop 1 which is assumed in this case to be the stop D on path $b_1$ above.

The user presses in succession keys of the keypad 17 (FIG. 2) corresponding to the characters b, 1, and D.

This simple interrogation immediately causes the screen 16 to display information relating to the waiting times at stop D for the next two buses expected to serve that stop.

This display may be achieved in any appropriate manner, e.g. by displaying the times in question in the clear, as digits representing minutes and seconds.

To obtain such a result, the microprocessor 15 is organized to respond to the above-defined interrogation "b1D" by automatically selecting from the signals 8 received by its antenna 11 those signals that correspond to the two buses serving path $b_1$ and to be found immediately upstream from stop D.

The information actually received in this respect from the transmitter 6 corresponds to the distances between those two buses and the stop D.

In an advantageous variant, the distances that can be deduced from said received information may be the "master distances" between each bus and its departure depot A: the distance between each bus and the "next stop" D served by that bus is easily calculated from said master distance by subtracting therefrom a constant which is the fixed distance between the departure depot and the "next stop" under consideration.

The calculation means included in the microprocessor 15 are designed to deduce the waiting times to be displayed from the above distances.

To this end, they make use of a parameter tied to the average speed of progress of buses along the path under consideration, which parameter may be a constant that is determined once and forever or it may be a variable that constitutes a closer approximation to reality and that can be determined in any appropriate manner.

It should be observed that the interrogation of the appliance 10 is not limited in any way to finding out about stop D on line b.

On the contrary, such consultation can relate to any of the various stops 1 included on the various lines of the network.

It should also be observed that in preferred embodiments, the total number of information units contained in the information transmitted over the electromagnetic path from the transmitter 6 and referenced 8 in the drawing is relatively small.

This number is no longer tied to the total number N of stops included in the various lines of the network, but is tied to the number n of buses 2 travelling along said lines, which number is generally at least three or four times smaller than the number N.

In addition, the information tied to each of the buses 2 under consideration relates solely to its own position, which may be defined by the distance to the following stop to be served on the line on which the bus is travelling or by the distance from the departure depot of the line, as in the variant explained above.

Such information can be expressed by a number p of units of information that is smaller than the number P required for identifying the positions of a plurality of buses relative to a given stop.

It follows from the above that the total number np of units of information that need to be transmitted over the electromagnetic path is much less in this case than in the context of previously known information systems, thereby making it possible to reduce the total time for transmitting all of the information, and thus to reduce the cycle period of the information: the information is preferably transmitted continuously and renewed without interruption.

The resulting reduction in said period can be a deciding factor in practical use of information systems of the kind under consideration.

Thus, if the updating period for information to be displayed is 1 minute, then certain users may find that unacceptable, whereas if said period has, on the contrary, a duration of only 10 seconds, the same users may find that quite satisfactory.

To further improve the response time of information systems under consideration, use may advantageously also be made of the following improvement: the portable appliance includes memory means capable of restoring all of the data concerning any cycle immediately preceding any given reception instant ("First In First Out" type memories); using such memory means, it is possible at any instant to recover from the recorded data, the data which corresponds to the interrogation made by the user at that instant, without there being any need to wait for the next transmission of said data from the transmitter 6.

To reserve useful reception of the signals 8 to portable receiver appliances 10 that are specially authorized, it is possible to make the signals secret by suitable encrypting or encoding, and to cause said appliances to include special means for decrypting at least some of the signals encrypted in this way, with decrypting itself possibly being restricted to signals concerning a single stop in a given network, or to a plurality of said stops, or on the contrary extending to all of said stops.

As a result, regardless of the implementation adopted, a system is obtained enabling bus users to be informed on the waiting times for the buses, and the structure, operation, and advantages of such systems can be seen sufficiently clearly from the above.

Naturally, and as can already been seen from the above, the invention is not limited in any way to those applications and embodiments that are particularly described; on the contrary, it extends to all variants.

We claim:

1. In a system for informing users of a bus network, the system comprising a management facility including means for receiving data identifying the instantaneous positions of buses travelling over lines of the network, means for responding to said data by generating electrical information signals concerning said positions, and means for transmitting said signals over an electromagnetic path, and a plurality of receivers, said receivers including portable receivers and each of said receivers having means for receiving said signals and for selecting from said signals those selected signals that have a relationship with a given stop, and means responsive to the selected signals for displaying information relating to the waiting times for buses at said stop, the improvement in said system wherein each of the electrical information signals transmitted by the electromagnetic path is associated with a given bus and is related to the distance between said given bus and a stop of the corresponding line, and wherein the portable receivers comprise interrogation means, actuable by users, for identifying any given stop of the network, and means for causing the electrical information signals corresponding to at least the nearest bus traveling towards a given stop to be selected in response to each interrogation by said interrogation means identifying said given stop so as to generate said selected signals, means responsive to said selected signals generated in response to said interrogatories for calculating the waiting times to be displayed, and means for displaying said times.

2. An information system according to claim 1, wherein the signals emitted over the electromagnetic path form a signal sequence that is transmitted cyclically, and wherein each portable receiver includes memory means for recording data relating to an immediately preceding complete transmission cycle so that the data regarding bus waiting times corresponding to each particular interrogation are made available instantly as soon as said particular interrogation has been performed.

3. An information system according to claim 1 wherein the signals transmitted over the electromagnetic path are encrypted signals and wherein the portable receivers include means for decrypting at least some of said encrypted signals.

* * * * *